S. BARNETT.
CLENCHER TIRE RETAINING DEVICE.
APPLICATION FILED SEPT. 9, 1912.
1,049,287.
Patented Dec. 31, 1912.
2 SHEETS—SHEET 1.
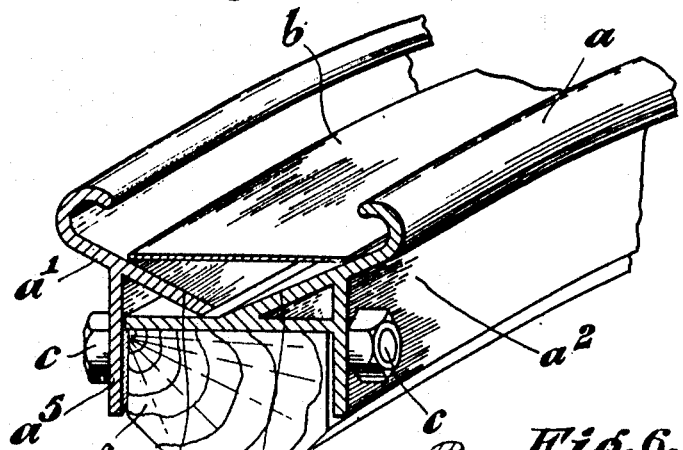
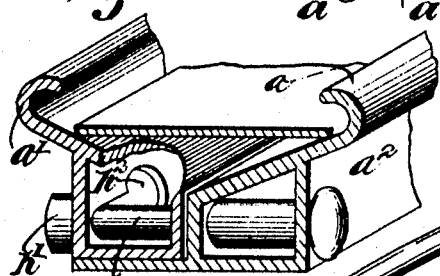
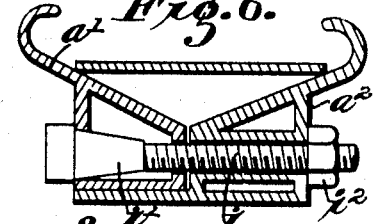
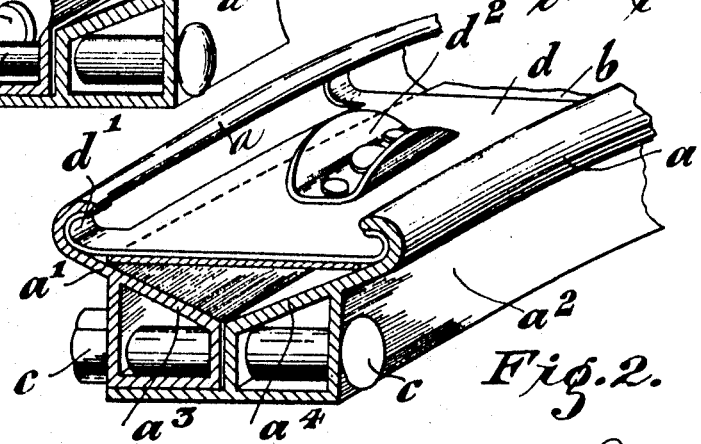

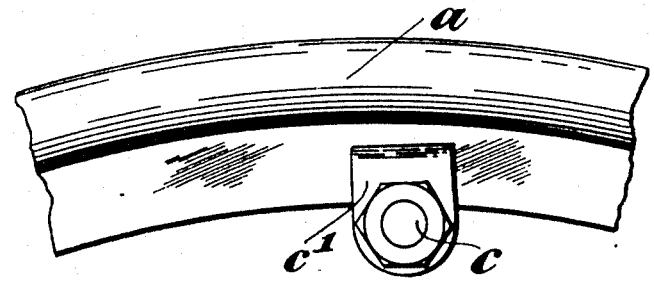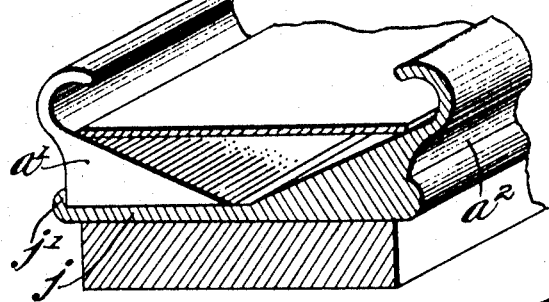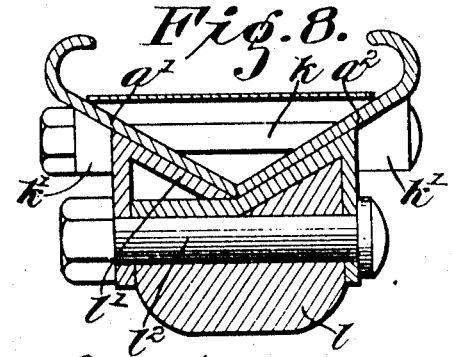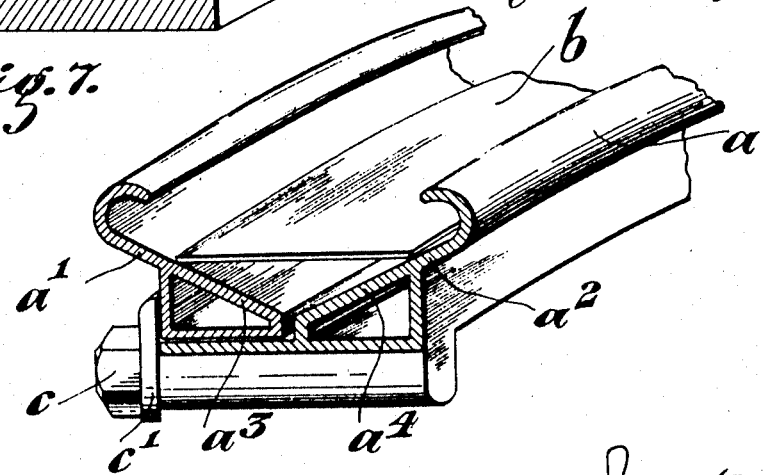

UNITED STATES PATENT OFFICE.

SAMUEL BARNETT, OF TIPTON, ENGLAND, ASSIGNOR TO JOSEPH DARIUS GRIFFIN, OF LONDON, ENGLAND.

CLENCHER-TIRE-RETAINING DEVICE.

1,049,287.  Specification of Letters Patent.  Patented Dec. 31, 1912.

Application filed September 9, 1912. Serial No. 719,471.

*To all whom it may concern:*

Be it known that I, SAMUEL BARNETT, a subject of the Kingdom of Great Britain, residing at Orchards, Burnt Tree, Tipton, in the county of Stafford, England, brickmaker, have invented certain new and useful Improvements in or Relating to Clencher-Tire-Retaining Devices, of which the following is a specification.

This invention comprises certain improvements in or relating to wheel rims suitable for use in connection with the road wheels of automobiles and the like, and it has for various of its several objects to facilitate the placing of a tire cover upon the rim, to provide a better mode and means for securing the tire and to produce a rim which has considerable advantages as compared with those heretofore used or proposed.

My invention in its most desirable form consists in the combination of dual inclined surface portions with an expansible hoop, the characteristic feature being that the inclined surface portions have a substantially constant declivity from points at or near the clencher portions of the rim sections to a position at or near the center thereof. No impediment is therefore offered to the sliding of the edges of the hoop member along a considerable part of the width of each of the inclined surface portions when one rim section is displaced toward the other, and this arrangement therefore provides for a material and fully sufficient range of expansion of the hoop entirely by the operation of displacing one inclined surface portion toward the other.

Other features of the present invention are referred to hereinafter and included in the appended claims.

In order that this invention may be clearly understood and more readily carried into practice, reference may be had to the appended explanatory drawings, upon which:—

Figure 1 is a perspective view of a section of one form of wheel rim constructed in accordance with the present invention. Fig. 2 is a similar view of a modified form of the invention illustrating also a form of security member which may be used in connection with the present invention. Fig. 3 is a similar view illustrating a further modification, and Fig. 4 is a part side elevation of the arrangement shown in Fig. 3. Fig. 5 is a perspective view, in section, of a further modification of my invention. Fig. 6 is a similar view of a still further modification. Fig. 7 is a similar view of a still further modification. Fig. 8 is a similar view of a still further modification.

According to this invention the rim $a$ adapted for the reception of the tire cover, instead of being substantially flat or level across its central part, is formed in two halves or rim sections $a^1$ $a^2$ having inclined surface portions or flanges $a^3$, $a^4$ meeting in the center in such a manner that when the rim sections $a^1$, $a^2$ are assembled together a cradle formation is provided around the periphery of the wheel. Before the tire cover is placed in position between these two rim sections, a flat hoop member $b$, split to permit of expansion, is positioned so that the beads rest upon the outer periphery of the hoop. The latter is then placed in position upon one rim section, the second rim section is then assembled, and on the one rim section being displaced toward the other by bolts or any suitable means $c$ the split hoop $b$ slides up the inclined surface portions of the rim sections $a^1$, $a^2$ respectively thereby expanding and forcing the beads of the cover into the clencher portions of the rim sections for their reception and forming an effective seating for the tire cover. The split hoop $b$, expanded or operated as aforedescribed acts as a substantial security member around the entire circumference of the wheel while there is no difficulty in assembling the cover as the split hoop will contract before being placed in position and will thus accommodate the new tires as well as old.

If necessary or desirable security members of the form shown at $d$, Fig. 2, may be employed adapted to take a position upon or adjacent to the outer surface of the hoop member, and to be placed in relation to the tire cover before assembling, said security members having hook shaped extensions or lugs $d^1$ which embrace the beads of the tire at different points, the other parts of the tire being supported when the whole is assembled by the rim sections. Such a security member $d$ has a member such as $d^2$, mounted more or less centrally, said member $d^2$ having for its purpose to take a position between the beads of the tire cover thereby keeping the beaded edges of the latter well under the clencher portions of the rim sections $a^1$, $a^2$.

The combination such as aforedescribed may be used in cases in which it is not proposed to construct the device so that it may be detached from the felly, that is to say as shown in Fig. 1, for instance which illustrates the invention in the form it would take as applied to the permanent felly of a wheel. In Fig. 1 $f$ is the wooden felly of the wheel and the rim sections $a^1$, $a^2$ take the form shown in the drawings, the rim section $a^1$ being furnished with a flange $a^5$ through the medium of which the rim section $a^1$ is drawn toward the rim section $a^2$.

In the arrangement shown in Fig. 2 both of the rim sections have an annular box formation of body giving considerable strength, the one box formation being adapted to slide upon an annular flange $a^6$ provided upon the other box formation. A slightly different arrangement is shown in Fig. 3 in which the tightening members $c$ instead of passing through the box part of the rim sections are incorporated in the form of bosses provided at the inner face of the rim section and furnished with tongue clamping members such as $c^1$ by which the lateral pressure is brought to bear upon the movable rim section.

In a further modification (Fig. 5) the one side section $a^1$ may be secured to the other side section $a^2$ by a bayonet or other equivalent engagement consisting for instance of headed studs $h$ adapted to take into key hole recesses $h^2$ so that the parts can be engaged by placing them together with the heads $h^1$ projecting through the key hole slots $h^2$ after which by a slight relative rotation of the one rim section with respect to the other, the two parts are efficiently locked together and can be so retained by any suitable means. As an example of such means I may employ a screwed stem having a tapered neck $i^1$ Fig. 6 adapted to take within a suitably shaped perforation in the rim section which is to be displaced so that upon tightening the screwed stem $i$ by a nut $i^2$ or the like the taper surface of the same bears within the perforation and thereby slightly displaces the movable section $a^1$ and effectively retains it in the slightly displaced position until the screwed stem is again withdrawn or released. According to a still further arrangement the annular flange provided upon the one rim section $a^2$ a flange $j$ such as shown in Fig. 7 is furnished with a preferably shallow outstanding annular flange $j^1$ or side web in which arrangement the movable section $a^1$ of the rim is split or cut at one point in its circumference to permit of its being expanded over the side flange $j^1$ into a position in which it is embraced by the same.

What I claim as my invention and desire to secure by Letters Patent is:—

1. A clencher tire retaining device for vehicle wheels comprising in combination, laterally separable rim sections having inturned clencher portions for engagement with the beads of the tire, said rim sections having surface portions extending toward the center of the device and inclined radially inwardly with respect to the wheel, and an expansible hoop adapted to be expanded by said surface portions against the bottoms of the beads to force the latter into said clencher portions upon inward movement of one rim section toward the other, substantially as described.

2. A clencher tire retaining device for vehicle wheels, comprising laterally separable rim sections having inturned clencher portions for engagement with the beads of the tire, said rim sections having flanges extending toward the center of the device and inclined radially inwardly with respect to the wheel, an expansible hoop disposed on said inclined flanges, and means closing the rim sections to engage the clencher portions with the beads of the tire and expand the hoop against the bottoms of the tire beads, one of said rim sections having a flange engaging beneath the companion rim section to maintain said inclined flanges in predetermined relation with respect to each other, substantially as described.

3. A clencher tire retaining device for vehicle wheels, comprising laterally separable rim sections having inturned clencher portions for engagement with the beads of the tire, said rim sections having flanges extending toward the center of the device and inclined radially inwardly with respect to the wheel, an expansible hoop surrounding said flanges and adapted to extend beneath the beads of the tire, a plate section disposed on said hoop and having lugs embracing the beads of the tire, and means for closing said rim sections to engage the clencher portions against the tire beads and expand the hoop toward the bottoms of said beads, substantially as described.

4. A clencher tire retaining device for vehicle wheel, comprising laterally separable rim sections having inturned clencher portions for engagement with the beads of the tire, said rim sections having flanges extending toward the center of the device and inclined radially inwardly with respect to the wheel, an expansible hoop surrounding said flanges and adapted to extend beneath the beads of the tire, a plate section disposed on said hoop and having lugs outwardly embracing the beads of the tire, a flanged device on said plate section engaging the inner faces of said tire beads, and means for closing said rim sections to engage the clencher portions against the tire beads and expand said hoop member toward the bottoms of said beads, substantially as described.

In witness whereof I have hereunto set my hand in the presence of two witnesses.

S. BARNETT.

Witnesses:
 ARTHUR BROWN,
 HOLLIS BROWN.

Copies of this patent may be obtained for five cents each, by addressing the "Commissioner of Patents, Washington, D. C."